US005626054A

United States Patent [19]

Rembert et al.

[11] Patent Number: 5,626,054

[45] Date of Patent: May 6, 1997

[54] LOAD DECOUPLER

[75] Inventors: Michael E. Rembert, Cypress; Robert W. Milner, Katy, both of Tex.

[73] Assignee: Bettis Corporation, Waller, Tex.

[21] Appl. No.: 526,683

[22] Filed: Sep. 11, 1995

[51] Int. Cl.[6] .................................................... F16H 21/22

[52] U.S. Cl. ............................ 74/104; 92/130 C; 92/138; 92/140; 403/56; 403/59; 403/114; 403/305

[58] Field of Search ............................ 74/104; 92/130 C, 92/138, 140; 403/114, 305, 56, 59, 360, 361

[56] References Cited

U.S. PATENT DOCUMENTS

| | | | |
|---|---|---|---|
| 746,360 | 12/1903 | McAdams | 403/56 X |
| 1,612,047 | 12/1926 | Owens | 92/140 |
| 2,456,182 | 12/1948 | Goble | 403/56 X |
| 3,704,986 | 12/1972 | Sheesley et al. | 74/104 |
| 3,727,523 | 4/1973 | Gulick | 92/130 C X |
| 4,702,150 | 10/1987 | Kaji | 92/138 X |

*Primary Examiner*—Allan D. Herrmann
*Attorney, Agent, or Firm*—Robert W. B. Dickerson

[57] ABSTRACT

Device for absorbing lateral forces generated as a result of a linearly reciprocating pin causing rotation of a scotch yoke, the device including a guide block guided along a guide rod, the guide block carrying a yoke engaging pin as well as having opposed connector-receiving cavities; connectors linking each cavity with opposed rod members, each connector having opposed curved surfaces and one or more flats intermediate adjacent such surfaces, the guide block positioning a plurality of annular members each having an arcuate surface slidably receiving one such curved surface, said block also including a locking device for engagement with each connector flat.

14 Claims, 10 Drawing Sheets

LOAD DECOUPLER

BACKGROUND OF THE INVENTION

One of the simplest ways to convert linear motion to rotary motion is by use of the scotch yoke mechanism shown in the schematic of FIG. 2. Piston "P", on moving linearly from its phantom line position to its solid line position, causes a force F1 to be transmitted to a connecting pin CP by piston rod R. Said pin slidably fits within conventional slots S in the arms of a yoke assembly. Thus, the application of force F1 results in reactive forces F2 and F3. These forces vary with the angle "A" of the yoke Y. Force F2 moves the yoke arms, thereby causing the rotary motion of the yoke. Force F3 is the vertical reaction to the vertical component of F2. In most scotch yoke mechanisms, this latter force F3 induces a bending moment in the piston rod R, causing the rod to bind and/or causing the piston to rub the cylinder wall. These result in any or all of excessive seal wear, cylinder wear, and premature failure of the rod bearing.

The most common way to deal with this lateral loading is to stabilize the piston rod end, opposite the piston, with an additional bearing, as shown by bearing B2 in FIG. 3. This is, however, a partial solution at best. The piston will still have a tendency to bend like a beam supported at both ends. Such bending still results in the rod binding in the bearings and/or the piston rubbing the cylinder wall. This invention addresses the problem of how to decouple the piston rod or rods from the lateral forces generated as a result of the yoke arm—yoke pin engagement.

SUMMARY OF THE INVENTION

The invention being presented here is unique in the way that a piston rod is substantially decoupled from the lateral forces generated by the yoke arms. Force F1, of FIG. 2, is transmitted to an intermediate guide or coupling block in a most unique manner. The guide block is allowed to float, i.e. swivel relative to the end of the piston rod, while axial movement of said piston rod is restrained relative to said guide block. While the guide rod may be deflected by the equivalent of force F3, the mentioned "float" effectively decouples the piston rod from the forces resulting from the forces causing such guide rod deflection. The float is effected by linking the piston rod end to a rod extension or connector. Said extension includes a head with opposed hemispherical surfaces for substantially frictionless engagement with a pair of spherical washers. Such rod extension or connector head and washers are positioned within a cavity provided the guide block. Likewise, said extension head includes a pair of flats, or truncations, engageable with a matching pair of angular lugs or steps provided the interior wall of said guide block cavity, whereby axial rotation of the rod extension, and thereby of the associated piston rod, is prevented.

DESCRIPTION OF A PREFERRED EMBODIMENT

Figure 1:
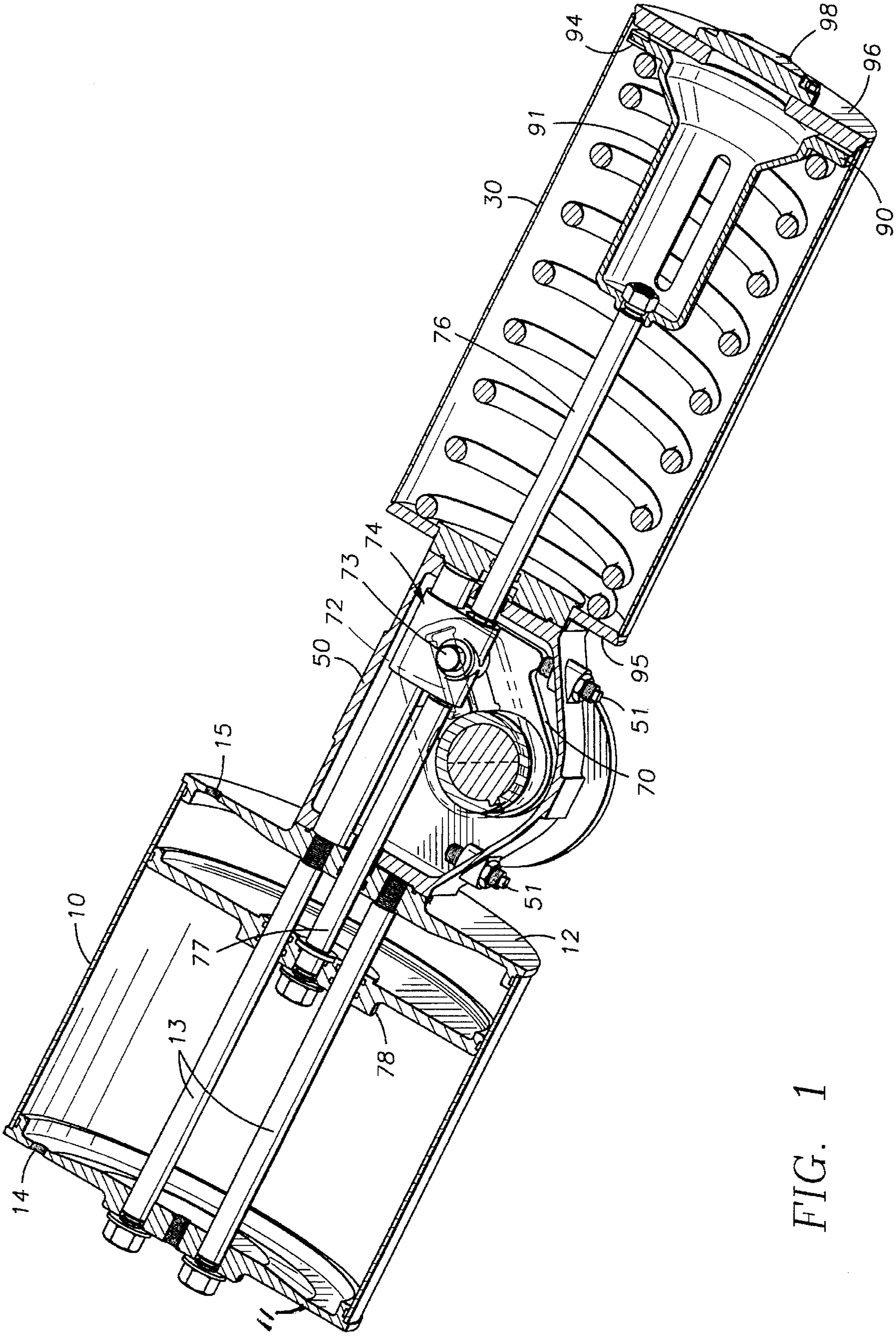
FIG. 1 is a broken perspective of the assembled actuator.

Looking first at FIG. 1, a valve actuator is shown of the type sold by Bettis Corporation. The actuator depicted includes a power cylinder 10, and a spring return cylinder 30, secured to opposite sides of a drive module 50. Rotatably mounted on the drive module is a scotch yoke device 70 having a hub 79 (see FIG. 6) and a pair of yoke arms 71 (see FIG. 6) spacedly depending therefrom. Each yoke arm is conventionally slotted at 72 so as to be rotated by yoke pin 73. This yoke pin is transversely carried by a guide block 74, which, in turn, longitudinally reciprocates or slides along a guide rod 75 (see FIG. 6) received within passageway 188 of stirrup 121, which rod has its ends secured to opposed end plates of the drive module 50. A pair of rods, one deemed a pull rod 76 and the other a piston rod 77, each has a first end secured to said guide block. These two first rod ends face each other. Drive module 50 also carries a pair of threaded stops 51 arcuately spaced apart by 90°, to limit rotation of the yoke arms. Said stops may be threadedly adjusted in a conventional manner. The second end of piston rod 77 is secured to reciprocating piston 78. This piston reciprocates within and sealingly engages the internal surface of power cylinder 10. Such cylinder includes oppositely disposed end plates 11 and 12, and the cylinder is made unitary by tie rods 13 which threadedly engage the said end plates. End plate 11 includes a breather aperture 14 for accommodating a breather device (not shown) which equalizes pressure with atmosphere in advance of piston 78 during the pressure or power stroke. The other end plate 12 includes a pressure port 15 to receive a fitting connecting said port to a source of fluid under pressure. None of the above art is new. The other end of pull rod 76 is linked to cup 91, which, in turn, depends from spring guide 90. Said spring guide 90 is annular in configuration.

Spring return cylinder 30 has its open ends, respectively, closed by inner end cap plate 95 and outer end cap 96. The latter member is centrally apertured which opening is removably sealed by cover plate 98. Plate 95 is centrally apertured at 100, said opening being secured by inner end cap hub 101 which is normally welded to said plate 95. A central opening 102 through hub 101 is annularly recessed to receive bushing 103. This bushing, in turn, reciprocatingly accommodates pull rod 76.

Figure 4:
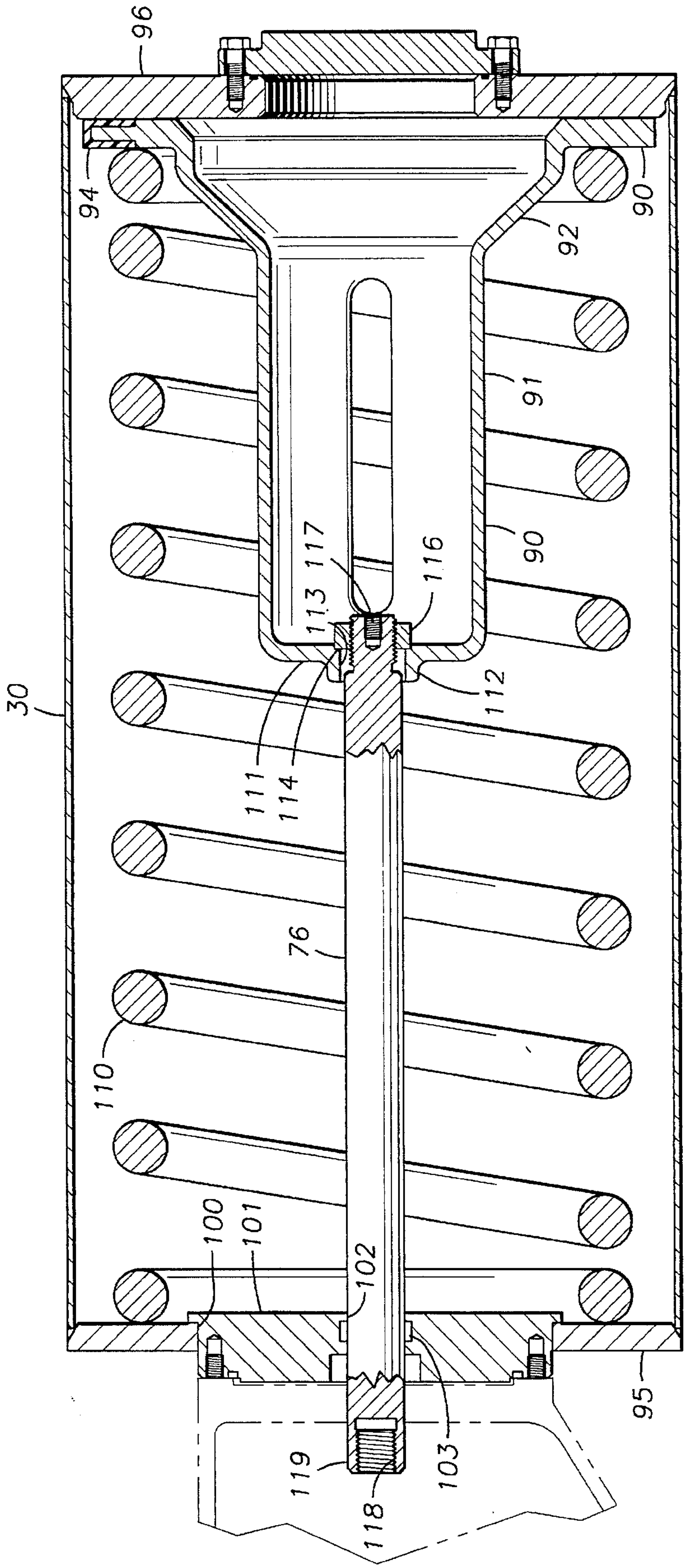
FIG. 4 is a partial axial section of the spring return cylinder of FIG. 1.

Spring 110 (see FIG. 4) circumscribes pull rod 76 to be seated against end cap plate 95 and spring guide 90.

The threaded second end of rod 76 carries hexagonal jam nut 116 and tool receiving bore 117. Said jam nut may be removably seated within a hexagonal depression 114, so as to cause rod 76 and cup 91 to reciprocate together.

Said first end of pull rod 76 is internally threaded at 118 and exteriorly grooved at 119 to receive a retainer ring, not shown.

Figure 5:
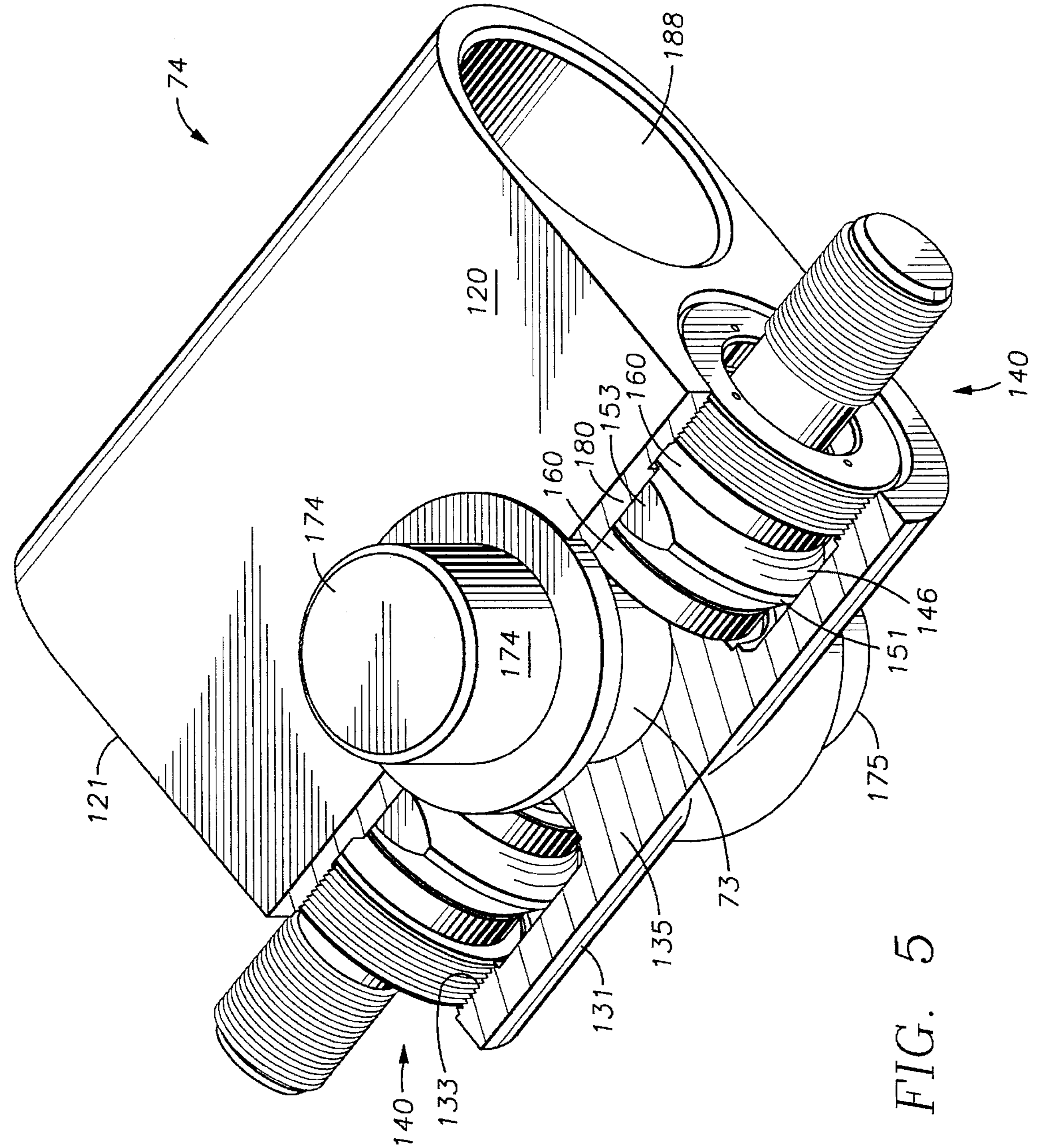
FIG. 5 is a perspective of the assembled guide block and spherical connector assemblies.
Figure 10:
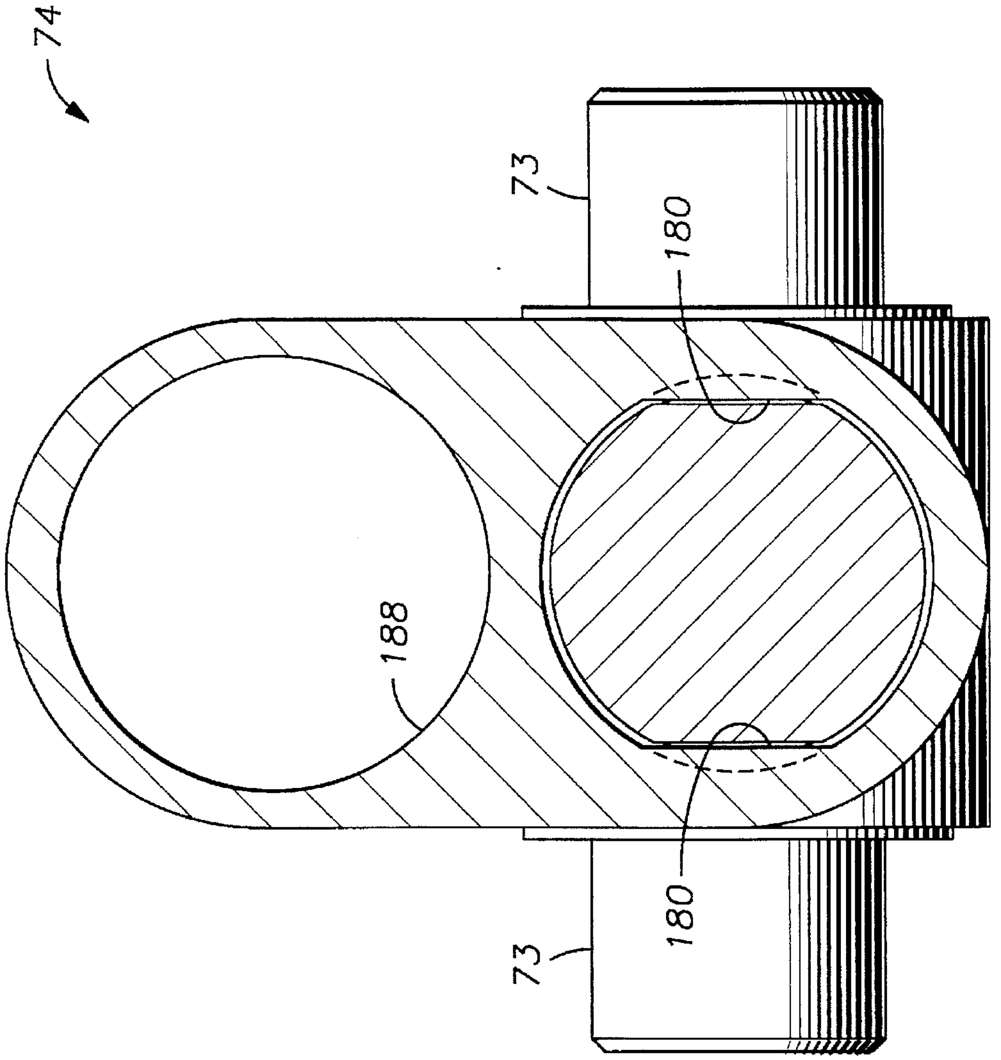
FIG. 10 is a sectional view of the assembled guide block taken along 10—10 of FIG. 11.
Figure 11:
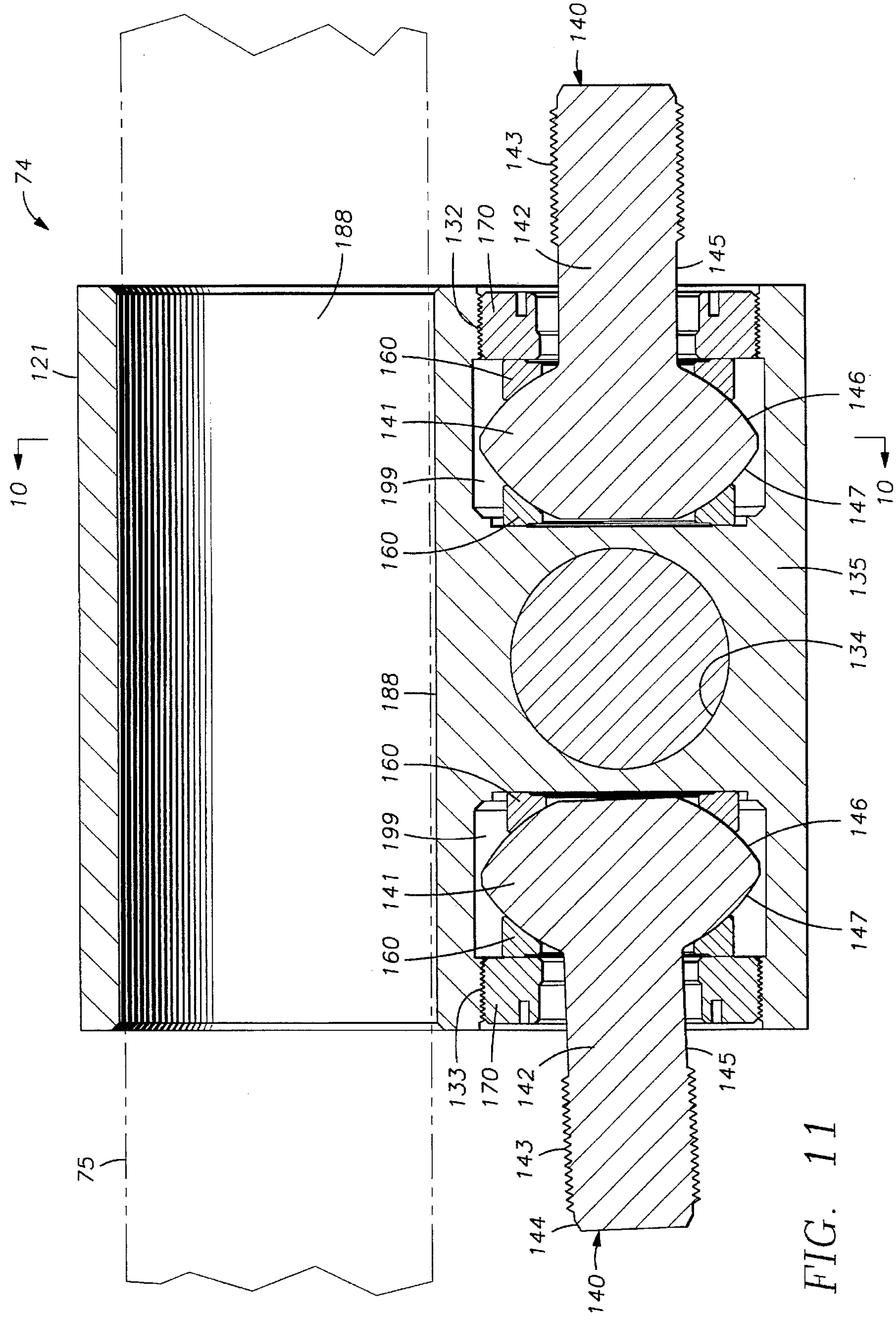
FIGS. 11, 11A are sections through the assembled guide block taken 90° apart.

Look now at FIGS. 5, 10 and 11 for a closer view of the guide block 74 which along with its pin 73, serves as a means for transmitting the force generated by piston 78 or spring 110, to yoke arms 71. Housing 120 includes upper stirrup-shaped portion 121 as well as lower portion 131. Said housing portion 121 includes an axially disposed cylindrical bore 188, which rides along and slidably reciprocates on guide rod 75. Lower housing portion 131 includes a pair of axially aligned, cylindrical, blind bores or cavities 199. Said cavities walls are threaded at 132 and 133. Lateral bore 134 extends perpendicularly to said blind bores through web portion 135 of housing portion 131. Yoke pin 73 is conventionally mounted in said guide block housing bore 134, with its ends 174, 175 slidably riding within yoke amslots 72 to cause yoke rotation.

Figure 6:
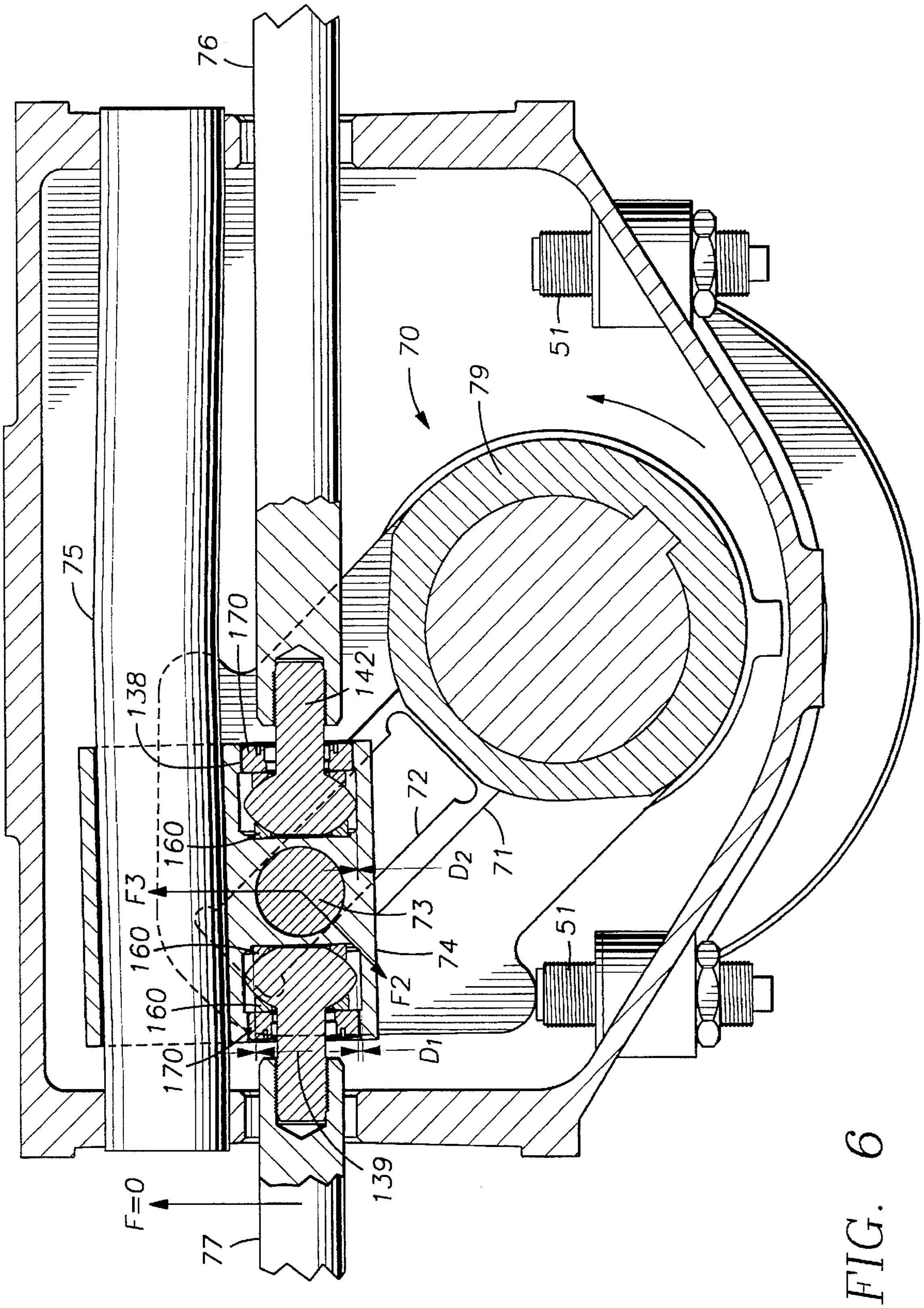
FIG. 6 is a horizontal section through the drive module.
Figure 9:
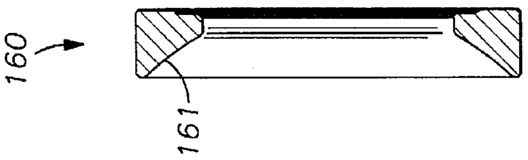
FIG. 9 is an axial section through a washer component of the connector assembly.
Figure 8:
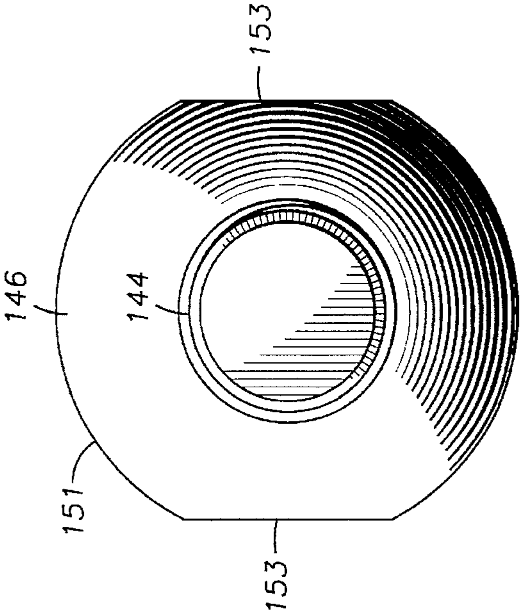
FIGS. 7 and 8 are, respectively, a side elevation and end view of a spherical connector.
Figure 7:
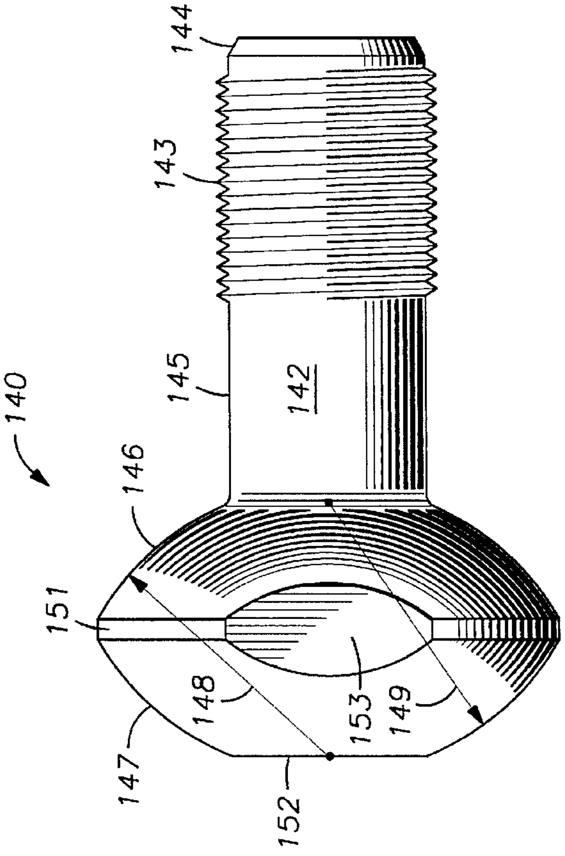
Figure 11A:
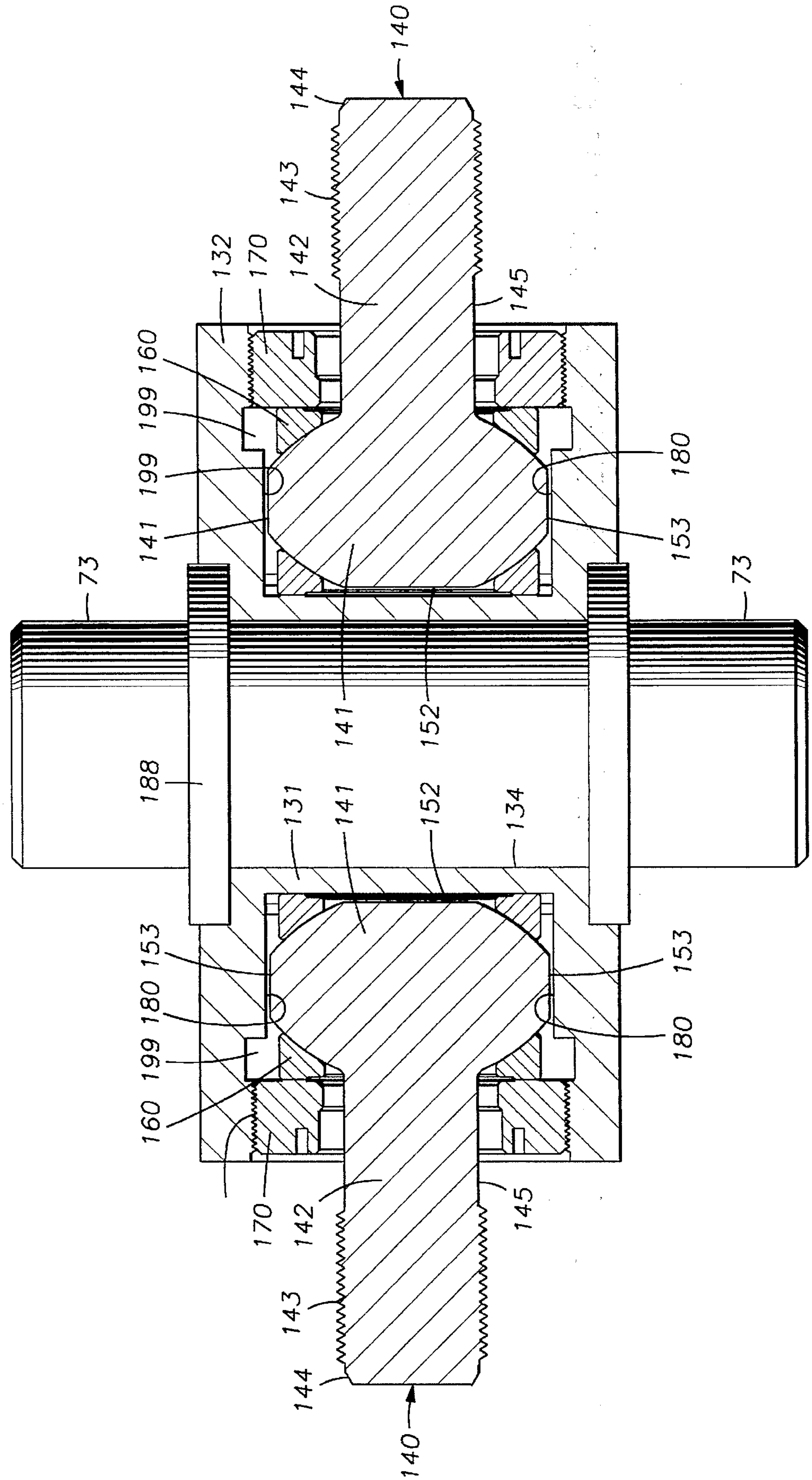

Right and left hand connectors, or rod extensions, 140 are more clearly depicted in FIGS. 6, 7 and 11. These connectors are interchangeable. Thus discussion of one will suffice. The connector comprises stub shaft 142 depending from knob or head 141 (see FIG. 11). Said stub is exteriorly threaded, at 143, intermediate its chamfered tip 144 and unthreaded neck 145. Inner and outer surfaces 146 (see FIG. 11), 147 of head 141 are of substantially a flattened, hemispheric contour. The curved portions of surface 146 represent a radius 148 (see FIG. 7), while such portions of surface 147 are a radius 149. At what would be the intersection of hemispheric surfaces 146, 147, a narrow flattened band, or annulus, 151 (see FIG. 5) separates such surfaces. Further, the polar center of surface 147, is flattened at 152 (see FIG. 11A). Finally, and significantly, flats 153 (see FIG. 11A), separated by 180°, are formed, thereby truncating head 141.

Each of a pair of ring-shaped washers 160 (see FIG. 11), has a spherically configured, concave surface 161. Each pair is positioned within cavity 199, in a facing arrangement. Thus each washer's concave surface 161 will slidably carry or nestingly receive one of surfaces, 146 or 147, of the connector head, somewhat on the order of a ball joint. An exterior ring member 170 (see FIG. 11) also encircles the stub. This ring member urges the adjacent washer against the adjacent head surface 146, and likewise urges head surface 147 against the other washer. The threads of exterior ring member 170 adjustably engage the wall threads 132, 133 of cavity 199. It should be noted that the walls of each cavity 199 are substantially cylindrical, save for opposed cast steps or lugs 180 (see FIG. 10), of sufficient angular length to receive flats 153 adjacent thereto. On such receipt, the connector 140, including its stub and head 142, 141, is substantially restrained from axial rotation within the associated cavity 199. Thus such interacting flats 153 and lugs 180 restrict relative rotation between the rods 76, 77 and the guide block 74. Finally, note that each stub's threads 143 would engage an end of pull rod 76 or of piston rod 77. Thus lugs 180 comprise stop means and flats 153 comprise a stop engaging means or surface.

The collection of connector 140, including its stub 142 and head 141, along with a pair of washers 160 (see FIG. 11) and a ring member 170, are collectively referred to as a connector assembly.

Consider now the installation and operation of the invention. Assume that guide block 74 is assembled as illustrated in FIG. 11, with the two facing connector assemblies locked in place, by virtue of connector flats 153 and guide block lugs 180. Guide rod 75 would extend through bore 188 and slidably carry the guide block. After connecting the power and the spring modules to the drive module, piston rod 77 and pull rod 76 would be threadedly engaged with threaded portions 143 of the opposed connector stub shafts. After engaging jam nut 116 with depression 114, the respective end plate 96 may be affixed to the spring return module. Prior to providing pressurized fluid to pressure port 15, the stop mechanisms 51 would be appropriately set.

Figure 2:
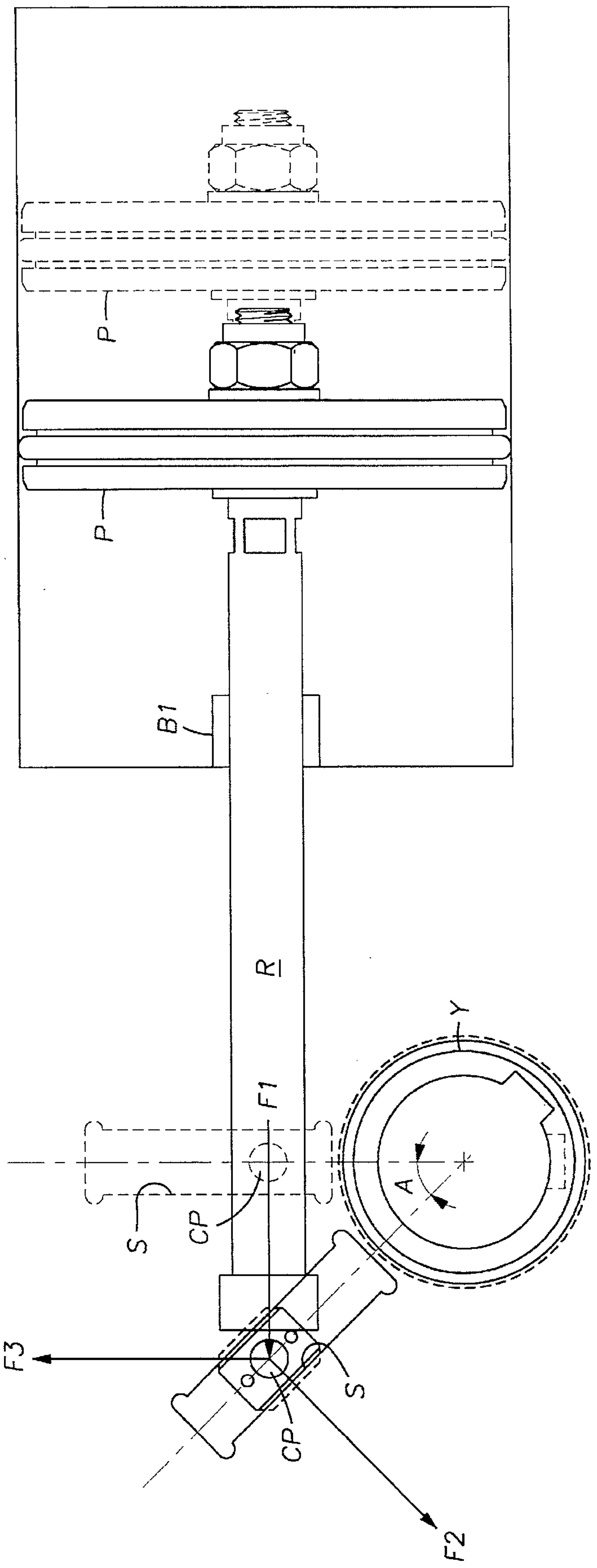
FIG. 2 is a schematic of the forces generated by a typical scotch yoke.
Figure 3:
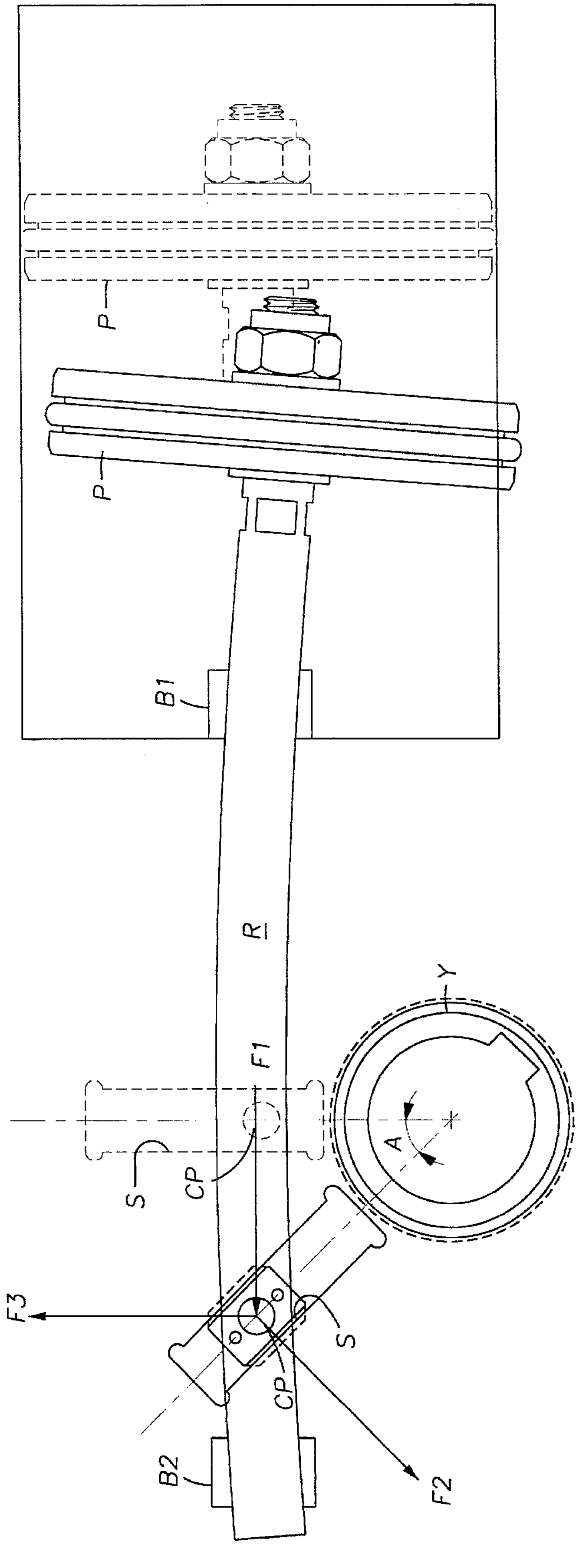
FIG. 3 is a further schematic depicting an additional piston rod bearing.

When such pressure is applied to the right hand side of power piston 78, such piston is moved toward end plate 11, along with piston rod 77, guide block 74, pull rod 76, spring guide 90, thereby compressing spring 110. As guide block 74 moves, it carries along yoke pin 73, which in turn oscillates the scotch yoke 70 by virtue of the pins ends riding in the yoke arms' slots. As mentioned earlier, and as depicted in FIGS. 2 and 3 a lateral force F3 is generated which would normally tend to bend the piston rod or the pull rod. This force F3 is also illustrated in FIG. 6, illustrating the present structure. This force component F3 is transmitted from the yoke arm to the yoke pin 73 to the guide block to the guide rod 75. This results in the guide rod being deflected, as generally illustrated by FIG. 6. As the guide rod deflects, so moves the guide block 74. The mechanism of this invention permits, for all practical purposes, the decoupling of the ends of rods 76 and 77 from said guide block. This occurs due to the substantially friction free, sliding or rolling engagement between surface 146, 147 and the concave surfaces 161 of spherical washers 160. Thus even though guide block 74 may deflect or cant, along with guide rod 75, the guide block floats or rotates, relative to the connector heads by virtue of the mentioned sliding engagement, so that the rods 76, 77 are not deflected by virtue of force F3. Obviously, head 141 and concave washers 160 may be coated with a low friction material. Note, for example in FIG. 6, the angular deflection of guide block 74. Since rods 76, 77 and their respective connectors remain axially aligned, the distances D1 and D2 may vary from each other, as a function of the angular position of the scotch yoke 70.

Although only a single embodiment has been described, it should be obvious that numerous modifications would be possible by one skilled in the art without departing from the spirit of the invention, the scope of which is limited only by the following claims.

We claim:

1. A device for dissipating lateral forces generated on converting linear motion to rotary motion, said device comprising:

- a linearly movable first rod member linked at one end thereof to force transmitting means via connector means;
- means for restricting relative rotation between said first rod member and said force transmitting means;
- rotatable member engaged with said force transmitting means via a pin connection;
- said connector means including;
  - hemispherically surfaced head linked to said first rod, and spherical washer means slidably engaging said head, said head and said washer means carried in a cavity of said force transmitting means, said head comprising oppositely facing curved surfaces and said washer means comprising oppositely facing, concave surfaced washers, each washer having a concave surface for slidably engaging said head;
- said rotation restricting means includes stop means provided the wall of said cavity and stop engaging means provided said head; and
- said stop engaging means comprises at least one flattened surface intermediate said curved surfaces.

2. An actuator for converting linear motion to rotary motion, said actuator comprising:

- a linearly movable first rod member linked at one end thereof to force transmitting means via connector means;

means for restricting relative rotation between said first rod member and said force transmitting means;

rotatable yoke member engaged with said force transmitting means via pin means carried by said force transmitting means; and said connector means includes a hemispherically surfaced head linked to said first rod, and said connector means also includes spherical washer means carried by said force transmitting means, said washer means having a concave surface for slidably engaging said head.

3. The actuator of claim 2 wherein said head and said washer means are positioned in a cavity provided in said force transmitting means.

4. The actuator of claim 3 wherein said rotation restricting means includes stop means provided in the wall of said cavity and a stop engaging surface provided in said head.

5. The actuator of claim 2 wherein said head comprises oppositely facing curved surfaces, and said washer means comprises spaced, oppositely facing, concave surfaced washers, each washer having a concave surface for slidably engaging said head, said head and said washers being positioned in a cavity provided in said force transmitting means.

6. The device of claim 5 wherein said rotation restricting means includes stop means provided in the wall of said cavity and stop engaging means provided in said head.

7. The device of claim 6 wherein said stop engaging surface comprises at least one flattened surface intermediate said head's curved surfaces.

8. A valve actuator having force transmitting means with a device for dissipating side loads, said actuator including:

linearly movable first and second rod members having facing first ends, each said first end being linked to force transmitting means via an associated connector means;

means for restricting relative rotation between each of said rod members and said force transmitting means;

rotatable yoke member engaged with said force transmitting means via pin means carried by said force transmitting means; and each said connector means including both a hemispherically surfaced head linked to its respective rod, and spherical washer means carried by said force transmitting means having a concave surface for slidable engagement with said head.

9. The actuator of claim 8 wherein each said connector means' head and washer means is positioned in a cavity in said force transmitting means.

10. The actuator of claim 9 wherein each said rotation restricting means includes stop means provided in the wall of its respective cavity.

11. The actuator of claim 8 wherein each said head comprises oppositely facing curved surfaces, and each said washer means comprises oppositely facing, concave surfaces for slidably engaging its associated head, each associated head and washers collectively deemed a connector assembly and each such assembly being positioned in a cavity provided in said force transmitting means.

12. The actuator of claim 11 wherein said rotation restricting means includes stop means provided in the wall of each said cavity and stop engaging means provided in each said head.

13. The device of claim 12 wherein said stop engaging means comprises at least one flattened surface intermediate the curved surfaces of an associated head.

14. The device of claim 12 wherein said stop engaging means comprises a pair of opposed flattened surfaces intermediate the curved surfaces of an associated head.

* * * * *